United States Patent
Stein et al.

(10) Patent No.: US 8,792,482 B2
(45) Date of Patent: Jul. 29, 2014

(54) METHOD AND APPARATUS FOR CORRELATION OF DATA SOURCES IN A VOICE OVER INTERNET PROTOCOL NETWORK

(75) Inventors: Jeffrey Stein, Cliffwood, NJ (US);
Li-Jin Chung, Lincroft, NJ (US);
Yu-Lein Kung, Holmdel, NJ (US); Alek Remash, Princeton, NJ (US);
Ching-Chyuan Shieh, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1381 days.

(21) Appl. No.: 12/331,029

(22) Filed: Dec. 9, 2008

(65) Prior Publication Data

US 2010/0142514 A1    Jun. 10, 2010

(51) Int. Cl.
*H04L 12/66* (2006.01)
*H04M 15/00* (2006.01)

(52) U.S. Cl.
USPC ...... 370/353; 370/355; 370/356; 379/112.06; 379/112.1; 379/114.04; 379/126

(58) Field of Classification Search
USPC ........ 370/352–356; 379/111, 112.01, 112.05, 379/112.1, 114.01–114.09, 124
See application file for complete search history.

(56) References Cited

U.S. PATENT DOCUMENTS

| | | | | |
|---|---|---|---|---|
| 6,359,976 | B1 * | 3/2002 | Kalyanpur et al. | 379/134 |
| 6,731,730 | B1 * | 5/2004 | Zolotov | 379/126 |
| 6,735,168 | B1 * | 5/2004 | Schnell et al. | 370/217 |
| 7,496,185 | B1 * | 2/2009 | Primavesi et al. | 379/126 |
| 7,583,794 | B1 * | 9/2009 | Croak et al. | 379/126 |
| 7,609,826 | B2 * | 10/2009 | Liu et al. | 379/126 |
| 8,289,885 | B2 * | 10/2012 | Cai et al. | 370/259 |
| 8,527,656 | B2 * | 9/2013 | Baker et al. | 709/239 |
| 2005/0031103 | A1 * | 2/2005 | Gunderman | 379/114.03 |
| 2005/0181796 | A1 * | 8/2005 | Kumar et al. | 455/445 |
| 2006/0098624 | A1 * | 5/2006 | Morgan et al. | 370/352 |
| 2006/0146792 | A1 * | 7/2006 | Ramachandran et al. | 370/352 |
| 2009/0067417 | A1 * | 3/2009 | Kalavade et al. | 370/356 |

* cited by examiner

*Primary Examiner* — Luat Phung
*Assistant Examiner* — Kai Chang

(57) ABSTRACT

In one embodiment, a method for managing a Voice over IP (VoIP) network includes collecting a first set of data from a first source of network performance management data, each data item in the first set of data corresponding to a call made using the VoIP network; collecting a second set of data from a second source of network performance management data, each data item in the second set of data corresponding to a call made using the VoIP network and being of a different type than the first set of data; correlating the first set of data and the second set of data such that a data item from the first set of data is matched with a data item from the second set of data that corresponds to a common call made over the VoIP network; and outputting a performance report based on the correlating.

18 Claims, 6 Drawing Sheets

Layout of SIP Text Record Between Two VOIP Network Elements for a Sample Answered Call time, SIP_from, SIP_to;
time_diff, INVITE, orig_IPaddr, term_IPaddr; time_diff,
100_Trying, orig_IPaddr, term_IPaddr; time_diff,
183_Progress, orig_IPaddr, term_IPaddr; time_diff,
200_OK, orig_IPaddr, term_IPaddr;   **time_diff,
RTP_Established, orig_IPaddr:port, term_IPaddr:port;**
time_diff, ACK, orig_IPaddr, term_IPaddr; time_diff, BYE,
orig_IPaddr, term_IPaddr; time_diff, 200_OK, orig_IPaddr,
term_IPaddr

Example SIP Text Record Between CCE & AS for a Sample Blocked Call

2007/09/28 12:34:56.7, SIP_from, SIP_to;
 0.0, INVITE, CCE_IPaddr, AS_IPaddr;
 0.1, 100_Trying, AS_IPaddr, CCE_IPaddr;
 15.1, CANCEL, CCE_IPaddr, AS_IPaddr;
 15.2, 200_OK, AS_IPaddr, CCE_IPaddr;
 15.3, ACK, CCE_IPaddr, AS_IPaddr

Example SIP Text Record Between CCE & AS for a Sample Cutoff Call

2007/09/28 12:34:56.7, SIP_from, SIP_to;
0.0, INVITE, AS_IPaddr, CCE_IPaddr;
0.1, 100_Trying, CCE_IPaddr, AS_IPaddr;
0.5, 183_Progress, CCE_IPaddr, AS_IPaddr;
10.3, 200_OK, CCE_IPaddr, AS_IPaddr;
10.3, RTP_Established, MS_IPaddr:port, NGBE_IPaddr:port;
18.3, 200_OK, CCE_IPaddr, AS_IPaddr;
26.3, 200_OK, CCE_IPaddr, AS_IPaddr;
34.3, 200_OK, CCE_IPaddr, AS_IPaddr;
42.3, 200_OK, CCE_IPaddr, AS_IPaddr;
50.3, BYE, CCE_IPaddr, AS_IPaddr;
50.4, 200_OK, AS_IPaddr, CCE_IPaddr;

METHOD AND APPARATUS FOR CORRELATION OF DATA SOURCES IN A VOICE OVER INTERNET PROTOCOL NETWORK

FIELD OF THE INVENTION

The present invention relates generally to Voice over Internet Protocol (VoIP) networks and relates more particularly to VoIP network maintenance automation.

In a VoIP network, diagnostics of network performance, reliability, and maintenance may be obtained from a plurality of sources, including, for example, Call Detail Records (CDRs) and Session Initiation Protocol (SIP) signaling data. The existence of these multiple data sources, however, results in a large amount of data that must be reviewed for service assurance, and much of this data may be duplicative (e.g., indicative of common network- or service-related events). In turn, the need to review all of this data may lead to delays in repairing problems in the network.

Thus, there is a need in the art for a method and apparatus for correlation of data sources in VoIP networks.

SUMMARY OF THE INVENTION

In one embodiment, the present invention is a method and apparatus for correlation of data sources in a Voice over Internet Protocol network. In one embodiment, a method for managing a Voice over IP (VoIP) network includes collecting a first set of data from a first source of network performance management data, where each data item in the first set of data corresponds to a call made using the call detail recording function of the VoIP network; collecting a second set of data from a second source of network performance management data, where each data item in the second set of data corresponds to a call made using the signaling function of the VoIP network, and where a type of the second set of data is different from a type of the first set of data; correlating the first set of data and the second set of data such that a data item from the first set of data is matched with a data item from the second set of data that corresponds to a common call made over the VoIP network; and outputting a performance alert and report based on the correlating.

BRIEF DESCRIPTION OF THE DRAWINGS

The teaching of the present invention can be readily understood by considering the following detailed description in conjunction with the accompanying drawings, in which:

FIG. 3 illustrates one example of a SIP text record for an exemplary answered call between VoIP network elements;

FIG. 4 illustrates one example of a SIP text record for an exemplary blocked call between a call control element and an applications server;

FIG. 5 illustrates one example of a SIP text record for an exemplary cutoff call between a CCE and an AS.

To facilitate understanding, identical reference numerals have been used, where possible, to designate identical elements that are common to the figures.

DETAILED DESCRIPTION

In one embodiment, the present invention is method and apparatus for correlation of data sources in VoIP networks. Embodiments of the invention correlate two separate sources of VoIP network performance management data, such as CDRs (which are conventionally generated for billing purposes) and SIP signaling data, in order to improve end-to-end network performance capabilities. Synthesis of the data sources allows for the identification of potential network- or service-related events in substantially real time, as well as for the provision of detailed root-cause analyses of these events.

Figure 1:
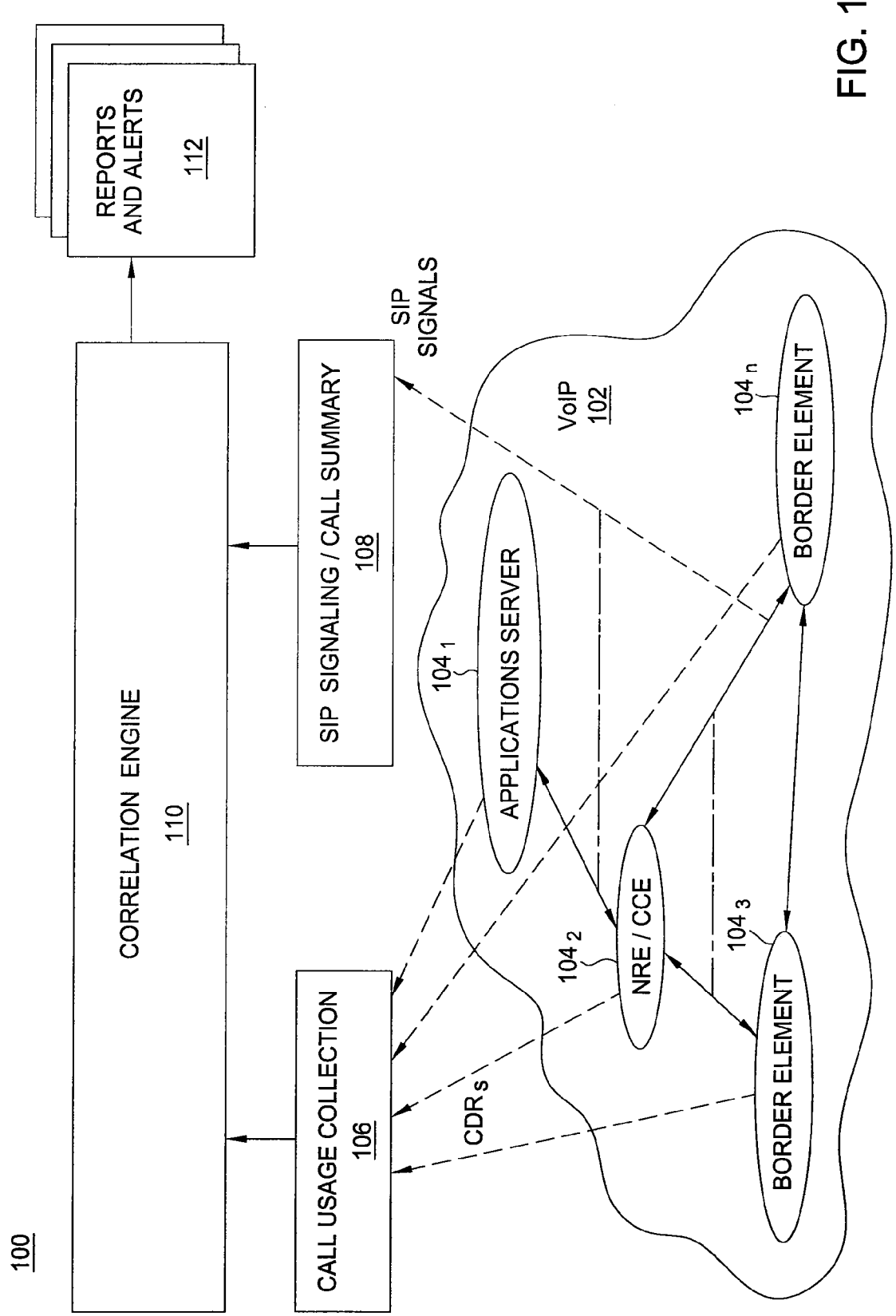
FIG. 1 is a schematic diagram illustrating one embodiment of a system for correlating data sources in a VoIP network, according to the present invention.

FIG. 1 is a schematic diagram illustrating one embodiment of a system 100 for correlating data sources in a VoIP network 102, according to the present invention. As illustrated, the system 100 comprises a call usage collection module 106 and a SIP signaling/call summary module 108, both of which are coupled to the VoIP network 102. In addition, both the call usage collection module 106 and the SIP signaling/call summary module 108 are coupled to a correlation engine 110.

The VoIP network 102 comprises a plurality of communicatively coupled nodes or network elements $104_1$-$104_n$ (hereinafter collectively referred to as "network elements 104") that facilitate the calls between the VoIP network users (e.g., border elements, application servers, network routing engine/call control elements (NRE/CCEs), and customer premise equipment such as customer premise routers).

The call usage collection module 106 collects CDRs from the network elements 104 and forwards these CDRs to the correlation engine 110. Similarly, the SIP signaling/call summary module 108 probes the network elements 104 for VoIP signaling protocols and correlates call flows for end-to-end call trace troubleshooting. In other words, the SIP signaling/call summary module 108 collects signaling message data for defect calls over the VoIP network 102. In one embodiment, defect calls are defined as calls for which the SIP call signaling patterns are abnormal. The SIP signaling/call summary module 108 also provides a text summary of the SIP signaling between the nodes involved in each defect call (on and end-to-end basis) over the VoIP network 102 to the correlation engine 110. In one embodiment, these text summaries include at least the following for each call: called number (node), calling number, and a time stamp.

The correlation engine 110 collects and classifies the CDRs and SIP call text summaries relayed by the call usage collection module 106 and the SIP signaling/call summary module 108. In one embodiment, the correlation engine classifies individual CDRs according to the status of the associated call (e.g., blocked, cutoff, ring/no answer, busy, successful, etc.). In one embodiment, this classification is performed in accordance with an N-field classification rule, where a CDR that satisfies an N-field classification rule is designated as a specific kind of defect (e.g., two fields for CCE CDRs: field one with a value a1 and field two with a value b1 indicates a blocked call, field one with a value a2 and field two with a value b2 indicates a cutoff call, etc.). These fields may indicate, for example, the direction of a call, the type of a call record, the duration of the call, or among others. In one embodiment, the correlation engine 110 receives SIP call text summaries only for defect calls. In one embodiment, the correlation engine 110 is a concept of one (COO) performance management platform, such as a performance management operation support system (PMOSS).

Based on the classification of the CDRs and SIP call text summaries, the correlation engine 110 correlates the defect CDRs and SIP call text summaries. In particular, the correlation engine 110 correlates the CDRs and SIP call text summaries for all calls in which either the CDR or the call text summary is classified as a "defect," as discussed above. For instance, CDRs that correspond to the same pair of called/calling numbers in a given window of time may be grouped together. Subsequently, SIP call text summaries for the same pair of called/calling numbers in the same window of time may be correlated with the group of CDRs. As a result, a CDR corresponding to a given call made over the VoIP network 102 is matched with a SIP call text summary for the same call. In one embodiment, correlation is based on at least one of the following for each call: calling number, called number, time stamp, and the IP addresses and ports of media and/or signaling nodes. In one embodiment, a sliding time window of configurable width is examined for matching calling/called number pairs in a given time interval.

In one embodiment, troubled pairs of nodes 104 are identified by analyzing SIP signaling call tests. The CDRs are then analyzed to identify the root cause of the defect call. Having correlated the defect CDRs and SIP call text summaries, the correlation engine 110 then generates and outputs (e.g. to a display or to a human operator) performance alerts and reports 112, where performance alerts and reports 112 are based on correlated CDR and SIP call text summary data. In one embodiment, the performance alert output contains one or more performance alerts, which are generated in substantially real time for network impacting events. The performance report output comprises consolidated CDR/SIP signaling data and provides an enhanced end-to-end call view including intermediate nodes that might otherwise not be caught through examination of the CDRs or the SIP signaling data individually. The performance alerts may, in turn, be used to generate trouble tickets indicative of errors in the VoIP network 102. An advantage of the present invention is that a single trouble ticket can be generated for a given event, where the single ticket includes both a view of the event as seen by the network elements 104 (i.e., as seen through the CDRs) and a view of the event that is independent of the network elements 104 (i.e., as seen through the SIP signaling data).

The system 100 therefore provides end-to-end performance reporting, substantially real time performance surveillance, and network management controls for the VoIP network 102.

Figure 2:
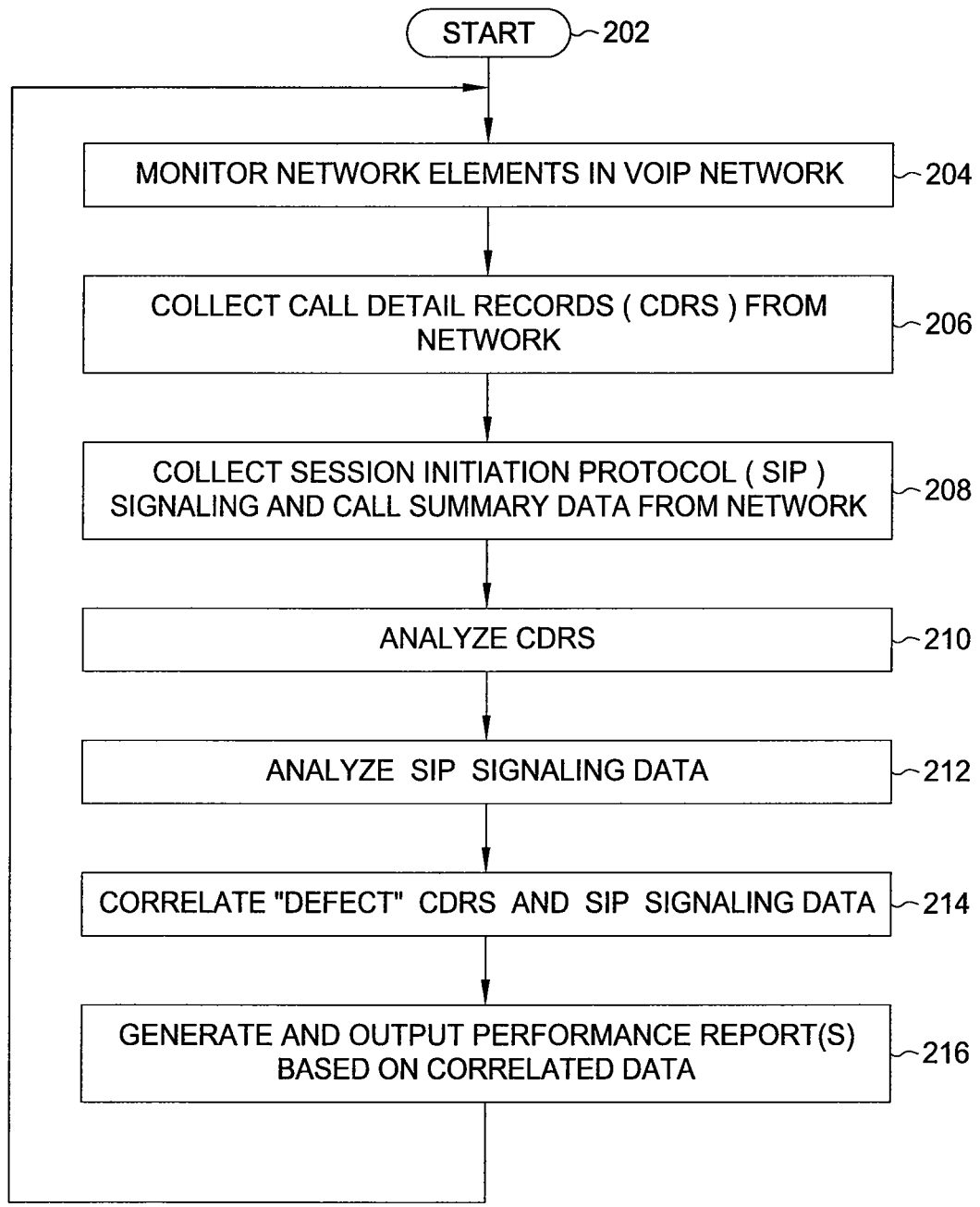
FIG. 2 is a flow diagram illustrating one embodiment of a method for correlating data sources in a VoIP network, according to the present invention.

FIG. 2 is a flow diagram illustrating one embodiment of a method 200 for correlating data sources in a VoIP network, according to the present invention. The method 200 may be implemented, for example, by the system 100 illustrated in FIG. 1. As such, description of the method 200 will make reference to several of the system components described above; however, it is to be understood that the method 200 is not limited to execution with the system 100.

The method 200 is initialized at step 202 and proceeds to step 204, where the call usage collection module 106 and the SIP signaling/call summary module 108 monitor the network elements 104 of the VoIP network 102. In step 206, the call usage collection module 106 collects CDR data from the network elements 104; similarly, in step 208, the SIP signaling/call summary module 108 collects SIP signaling and call summary data from the network elements 104.

In step 210, the correlation engine 110 analyzes the CDRs collected by the call usage collection module 106; similarly, in step 212, the correlation engine 110 analyzes the SIP signaling and call summary data collected by the SIP signaling/call summary module 108. In one embodiment, step 210 involves the further step of identifying "defect" CDRs, as discussed above. In one embodiment, step 212 involves analyzing "defect" SIP signaling and call summary data (e.g., data associated with calls for which the SIP call signaling patterns are abnormal).

In step 214, the correlation engine 110 correlates the "defect" CDRs and the SIP signaling and call summary data for all calls in which either the CDR or the call text summary is classified as a "defect," as discussed above. In one embodiment, correlation first involves identifying troubled pairs of nodes based on the SIP signaling and call summary data. Having identified a troubled pair of nodes, the root cause of the trouble is then identified based on the CDRs. For example, a group of CDRs may indicate that a certain switch in the VoIP network 102 observed one thousand blocked calls in a span of fifteen minutes. Correlated SIP signaling data may indicate that all of these blocked calls originated from the same VoIP network element.

The correlation engine 110 then generates and outputs performance alerts and reports based on the correlated data, as discussed above. The method 200 then returns to step 204 and proceeds as discussed above to monitor the network elements 104.

FIGS. 3-5 illustrate the layouts of exemplary SIP text records that may be used in the correlation of VoIP network data sources, according to embodiments of the present invention. Specifically, FIGS. 3-5 represent examples of text summaries of the SIP signaling between network elements that may be generated by the SIP signaling/call summary module 108 of FIG. 1, as discussed above.

In particular, FIG. 3 illustrates one example of a SIP text record 300 for an exemplary answered call between two VoIP network elements; FIG. 4 illustrates one example of a SIP text record 400 for an exemplary blocked call between a call control element (CCE) and an applications server (AS); and FIG. 5 illustrates one example of a SIP text record 500 for an exemplary cutoff call between a CCE and an AS. In FIGS. 3-5, spaces and line breaks are included for clarity; embodiments of the invention generate actual SIP text records on single lines without spaces. In some embodiments of the invention, the SIP text records also include the signaling between other network elements for the call (e.g., Internet Protocol border elements (IPBEs) and network gateway border elements (NGBEs)).

Figure 6:
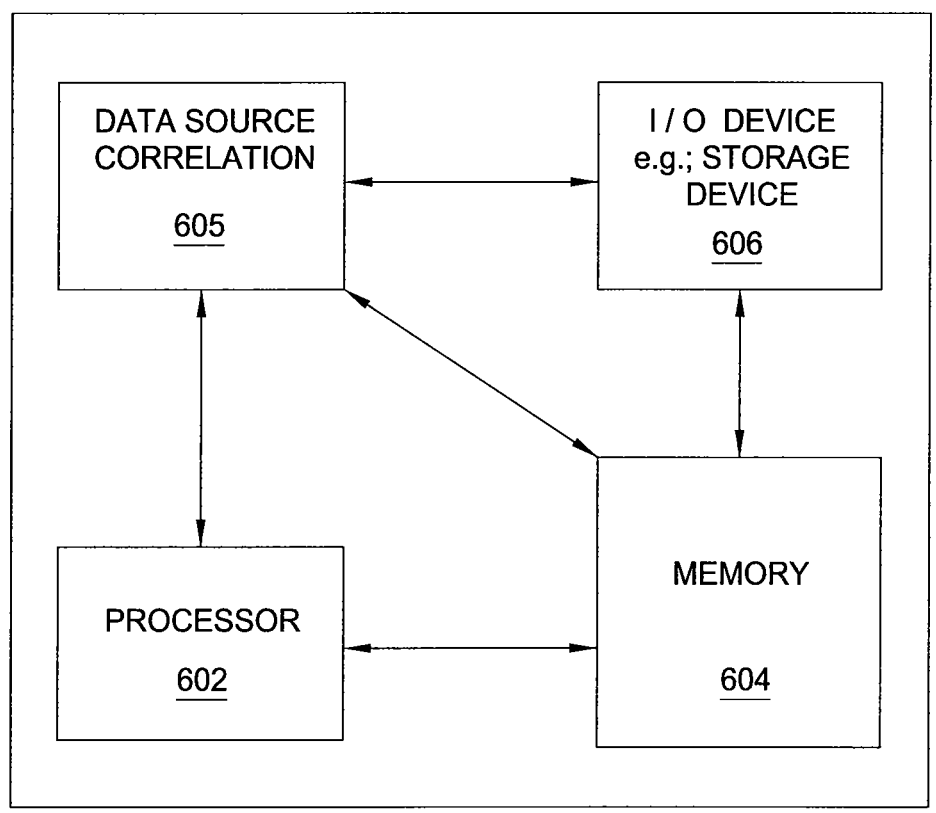
FIG. 6 is a high level block diagram of the data source correlation method that is implemented using a general purpose computing device.

FIG. 6 is a high level block diagram of the data source correlation method that is implemented using a general purpose computing device 600. In one embodiment, a general purpose computing device 600 comprises a processor 602, a memory 604, a data source correlation module 605 and various input/output (I/O) devices 606 such as a display, a keyboard, a mouse, a modem, and the like. In one embodiment, at least one I/O device is a storage device (e.g., a disk drive, an optical disk drive, a floppy disk drive). It should be understood that the data source correlation module 605 can be implemented as a physical device or subsystem that is coupled to a processor through a communication channel.

Alternatively, the data source correlation module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the data source correlation module 605 for correlating data sources in a VoIP network described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing a voice over internet protocol network, comprising:
   collecting, by a processor, a set of call detail record data, each of a plurality of data items in the set of call detail record data corresponding to a call detail record made using a call detail recording function of the voice over internet protocol network;
   collecting, by the processor, a set of session initiation protocol signaling message data from multiple calls between a plurality of nodes in the voice over internet protocol network, each of a plurality of data items in the set of session initiation protocol signaling message data corresponding to a call signaling data of a plurality of calls made using a signaling function of the voice over internet protocol network, wherein the set of session initiation protocol signaling message data comprises session initiation protocol signaling message data for defect calls only;
   correlating, by the processor, the set of call detail record data and the set of session initiation protocol signaling message data such that a data item from the set of call detail record data is matched with a data item from the set of session initiation protocol signaling message data that corresponds to a common call made over the voice over internet protocol network; and
   outputting, by the processor, a performance report based on the correlating.

2. The method of claim 1, wherein the set of call detail record data comprises multiple call detail records collected from the plurality of nodes in the voice over internet protocol network.

3. The method of claim 1, wherein a text summary for the session initiation protocol signaling message data associated with a given call comprises a number called during the given call, a number doing the calling during the given call, and a time stamp of the given call.

4. The method of claim 1, wherein the correlating comprises:
   classifying individual data items from the set of call detail record data to identify defects; and
   associating each of the individual data items from the set of call detail record data that is identified as a defect with a corresponding data item from the set of session initiation protocol signaling message data.

5. The method of claim 1, wherein the correlating is based on a number called during a call corresponding to a data item from the set of call detail record data and a data item from the set of session initiation protocol signaling message data.

6. The method of claim 5, wherein the correlating is performed over a defined window of time.

7. The method of claim 6, wherein the defined window of time is configurable.

8. The method of claim 1, wherein the correlating is based on a time stamp of the call corresponding to the data item from the set of call detail record data and the data item from the set of session initiation protocol signaling message data.

9. A non-transitory computer readable storage medium containing an executable program for managing a voice over internet protocol network which, when executed by a processor, causes the processor to perform operations for processing a signaling message, the operations comprising:
   collecting a set of call detail record data, each of a plurality of data items in the set of call detail record data corresponding to a call detail record made using a call detail recording function of the voice over internet protocol network;
   collecting a set of session initiation protocol signaling message data from multiple calls between a plurality of nodes in the voice over internet protocol network, each of a plurality of data items in the set of session initiation protocol signaling message data corresponding to a call signaling data of a plurality of calls made using a signaling function of the voice over internet protocol network, wherein the set of session initiation protocol signaling message data comprises session initiation protocol signaling message data for defect calls only;
   correlating the set of call detail record data and the set of session initiation protocol signaling message data such that a data item from the set of call detail record data is matched with a data item from the set of session initiation protocol signaling message data that corresponds to a common call made over the voice over internet protocol network; and
   outputting a performance report based on the correlating.

10. A system for managing a voice over internet protocol network, comprising:
    a processor; and
    and a computer-readable medium storing instructions which, when executed by the processor, cause the processor to perform operations, the operations comprising:
    collecting a plurality of call detail records collected from a plurality of nodes in the voice over internet protocol network;
    collecting session initiation protocol signaling message data collected from a plurality of calls between the nodes in the voice over internet protocol network, wherein the session initiation protocol signaling message data comprises session initiation protocol signaling message data for defect calls only;
    correlating the plurality of call detail records and the session initiation protocol signaling message data such that an individual call detail record is matched with an individual item of the session initiation protocol signaling message data that corresponds to a common call made over the voice over internet protocol network; and
    outputting a performance report based on the correlating.

11. The system of claim 10, wherein the operations further comprise converting the session initiation protocol signaling message data to a text summary form.

12. The system of claim 11, wherein a text summary for session initiation protocol signaling message data associated with a given call comprises a number called during the given call, a number doing the calling during the given call, and a time stamp of the given call.

13. The system of claim 10, wherein the correlating comprises:
classifying individual ones of the call detail records to identify defects; and
associating each of the individual ones of the call detail records that is identified as a defect with a corresponding item of the session initiation protocol signaling message data.

14. The system of claim 13, wherein the individual ones of the plurality of call detail records are classified in accordance with an N-field classification rule.

15. The system of claim 10, wherein the correlating is based on a number called during a call corresponding to a given one of the call detail records and a given item of the session initiation protocol signaling message data.

16. The system of claim 15, wherein the correlating is performed over a defined window of time.

17. The system of claim 16, wherein the defined window of time is configurable.

18. The system of claim 10, wherein the processor comprises a correlation engine that is a concept of one performance management platform.

\* \* \* \* \*